United States Patent
Grauby et al.

(10) Patent No.: US 6,569,047 B2
(45) Date of Patent: May 27, 2003

(54) DRIVE DEVICE COMPRISING A HYDRAULIC MOTOR AND A REDUCTION GEAR

(75) Inventors: André Grauby, Compiegne (FR); Louis Martin, Compiegne (FR); Jacques Fontaine, Verberie (FR); Stéphane Vidal, Longueil-Sainte-Marie (FR); Jean-Marie Rouillard, La Croix Saint-Ouen (FR)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 09/949,168

(22) Filed: Sep. 7, 2001

(65) Prior Publication Data

US 2002/0045509 A1 Apr. 18, 2002

(30) Foreign Application Priority Data

Sep. 7, 2000 (FR) .............................. 00 11380

(51) Int. Cl.⁷ .............................................. F16H 47/04
(52) U.S. Cl. ........................................ 475/31; 475/83
(58) Field of Search .......................... 475/31, 83, 159, 475/161; 74/606 R (56) References Cited

U.S. PATENT DOCUMENTS

| | | | | |
|---|---|---|---|---|
| 3,770,075 A | * | 11/1973 | Vegners ....................... 475/83 |
| 3,785,157 A | * | 1/1974 | Kittle et al. ................... 60/493 |
| 4,691,802 A | * | 9/1987 | Ishimori et al. ........... 74/606 R |
| 5,525,115 A | * | 6/1996 | Vanzini ....................... 475/146 |
| 5,746,509 A | * | 5/1998 | Gebhard et al. ............... 366/61 |
| 5,813,228 A | * | 9/1998 | Kubota et al. ................. 475/83 |
| 5,820,506 A | | 10/1998 | Mann .......................... 475/83 |

FOREIGN PATENT DOCUMENTS

JP   09165783   6/1997

* cited by examiner

Primary Examiner—Sherry Estremsky
(74) Attorney, Agent, or Firm—Ladas & Parry (57) ABSTRACT

A drive device incorporating a hydraulic motor and a planetary reduction gear. The motor includes a housing in which radial pistons are disposed. The device includes a coupling between the output of the motor and the input of the reduction gear, the reduction gear including a housing in which a planetary reduction gear system is disposed having an output provided for driving in rotation. The housing of the motor and the housing of the reduction gear form distinct enclosures and the device allows circulation of fluid between these housings and for controlling this circulation by limiting this circulation in at least one direction of circulation between the housing of the motor and the housing of the reduction gear.

24 Claims, 4 Drawing Sheets

FIG.7

DRIVE DEVICE COMPRISING A HYDRAULIC MOTOR AND A REDUCTION GEAR

FIELD OF THE INVENTION

The present invention relates to a drive device incorporating a hydraulic motor and a planetary reduction gear, the motor comprising a housing inside which is disposed a cylinder block with radial pistons, the device comprising means for coupling between the output of the motor and the input of the reduction gear, the latter comprising a housing inside which is disposed a planetary reduction gear system and having an output provided with means for driving in rotation.

A drive device of this type may, for example, be used for driving a concrete mixer, the output of the reduction gear forming drive shaft for the drum. Such a device may also be used for driving machines such as grinders, winches, mixers (for example for the chemical or food industry), or for systems of translation. In such situations, the output of the reduction gear is adapted to the different uses.

BACKGROUND OF THE INVENTION

EP 0 482 660 discloses a device of this type, in which the housing of the motor and the housing of the reduction gear are separated by sealing means. Insofar as the degree of cleanliness of the fluid required for the hydraulic motor is greater than that required for the planetary reduction gear, such separation makes it possible to avoid that a possible pollution of the fluid contained in the housing of the reduction gear, due for example to wear of the teeth of the gears contained in this housing, reaches the housing of the motor. On the other hand, such separation renders necessary two distinct sources of fluid, connected to the two housings by distinct circuits, in which the fluid pressure must be controlled by appropriate means.

WO 94/23918, for example, also discloses a drive device in which the housing of the motor and that of the planetary reduction gear form one and the same enclosure. This arrangement presents the advantage of requiring only one source of fluid for this common enclosure but, on the other hand, it presents the risk of a pollution of the fluid, due for example to wear of the reduction gear, contaminating the interior space of the motor housing.

It is an object of the present invention to improve the known device of the type mentioned above.

SUMMARY OF THE INVENTION

This object is attained with the device of the invention thanks to the fact that the housing of the motor and the housing of the reduction gear form distinct enclosures and that it comprises means for allowing a circulation of fluid between said housings and for controlling this circulation of fluid by limiting the circulation of fluid at least in one direction of circulation between the housing of the motor and the housing of the reduction gear.

Thanks to these arrangements, one and the same source of fluid is sufficient to feed the housing of the motor and that of the reduction gear.

From that standpoint, the invention presents the advantages of the devices in which the housing of the motor and that of the reduction gear are common.

However, the two housings are distinct and the circulation between them is controlled, which makes it possible for example to have different fluid pressures prevailing in the two housings or to arrange for only one of the two to be totally filled.

Thus, in that point of view, the device of the invention presents the advantages of the devices in which the housing of the motor and that of the reduction gear are isolated. In particular, the means for allowing a controlled circulation of fluid between the housing of the motor and the housing of the reduction gear may be chosen so as to ensure that the housing of the motor is filled permanently and that the pressure of the fluid in this housing does not exceed a predetermined value. For the fluid contained in the motor housing, the housing of the reduction gear may perform the role of an expansion vessel.

In addition, it will be noted that the means controlling the circulation of fluid may make it possible to avoid, or at least limit, the risks of a possible pollution inside the housing of the reduction gear being transmitted to the motor housing. For example, the control means may be made so as to prevent the impurities of dimension greater than a given dimension and found in the housing of the reduction gear, from penetrating into that of the motor.

According to one embodiment, the device comprises at least one conduit for circulation of fluid between the motor housing and the reduction gear housing, and said conduit is equipped with said means for limiting the circulation of fluid at least in one direction of circulation between the housing of the motor and the housing of the reduction gear.

These means are for example advantageously constituted by a restriction and/or by a non-return valve.

The device advantageously comprises a filling or a draining port, common to the housing of the motor and to the housing of the reduction gear, this port communicating with a filling or draining conduit common to said housings, and this filling or draining conduit forms a conduit for circulation of fluid between said housings.

This port and this conduit are therefore employed both for performing the function of filling or of draining of the housings and for allowing the controlled circulation of fluid between them, this limiting the number of machinings necessary for performing these two functions.

The filling or draining port is advantageously obturated by a stopper which cooperates with the means for controlling the circulation of fluid between the housings of the motor and of the reduction gear.

The housing of the motor and the housing of the reduction gear are advantageously separated by a separation wall, and the fluid circulation conduit is formed in this separation wall.

This arrangement renders the drive device particularly compact and simple. Moreover, it is inexpensive to manufacture.

According to an advantageous arrangement, the device comprises a first and a second conduit for circulation of fluid between the motor housing and the reduction gear housing, the first conduit cooperating with a first non-return system which allows the circulation of the fluid only in the direction going from the reduction gear housing towards the motor housing, while the second conduit cooperates with a second non-return system which allows the circulation of the fluid only in the direction going from the motor housing towards the reduction gear housing, when the difference in pressure between said housings is at least equal to a given value.

A filter may be arranged on the first conduit to avoid the impurities located in the housing of the reduction gear penetrating into that of the motor. The first non-return system may be constituted by a conventional non-return valve. The second non-return system, which cooperates with the second conduit, makes it possible to maintain a sufficient fluid pressure in the motor housing. It is, for example, a non-return valve calibrated to a given pressure.

The first and second fluid circulation conduits are advantageously formed in the separation wall.

In certain applications, the drive device according to the invention may be fed in open circuit. This is the case for example for the motorization of a hauling winch.

However, it may be advantageous to use a closed circuit, for example for driving a concrete mixer drum. The fluid feed circuit of the drive device according to the invention is for example a closed circuit comprising a main pump which comprises a housing, presenting two main suction or delivery ports and which is intended to feed a main circuit comprising main feed and exhaust conduits of the hydraulic motor, the circuit further comprising a booster pump having a main suction port connected to a fluid reservoir.

In this circuit, the fluid reservoir is advantageously constituted by the housing of the hydraulic motor.

The booster pump serves to maintain in the circuit a sufficient fluid pressure to avoid the phenomena of cavitation. The circuit is simplified by the fact that the fluid reservoir from which the booster pump draws the booster fluid is directly constituted by the housing of the hydraulic motor. It is therefore unnecessary to provide a reservoir in the form of a separate enclosure. The number of components of the circuit is thus limited and the assembly is very compact.

This circuit further comprises an exchange or replenishing unit adapted to draw fluid from the main circuit and means for returning cooled fluid to the reservoir constituted by the housing of the hydraulic motor.

The exchange or replenishing unit is advantageously integrated in the housing of the main pump and is directly connected to said housing, to inject thereinto the fluid drawn from the main circuit, without a conduit outside said housing; moreover, the housing of the main pump is connected to the housing of the hydraulic motor by a pipe for return of fluid towards said housing of the hydraulic motor, on which cooling means are disposed.

The exchange unit draws fluid from the main circuit and injects it into the housing of the main pump. The fluid is drawn from the main circuit, upstream of the ports for connection of the pump to the main conduits of the motor. In this way, no outside conduit is necessary either for drawing the fluid or for injecting it into the housing of the main pump. The drawing and injection circuit is therefore extremely short. For cooling the motor, the fluid is drawn from the housing of the pump and is injected into the housing of the motor after having been cooled. In this way, the exchange circuit allows both the motor housing and the pump housing to be flushed.

BRIEF DESCRIPTION OF THE DRAWINGS

The invention will be more readily understood on reading the following description of an embodiment given by way of non-limiting example, with reference to the accompanying drawings, in which.

DESCRIPTION OF PREFERRED EMBODIMENTS

Figure 1:
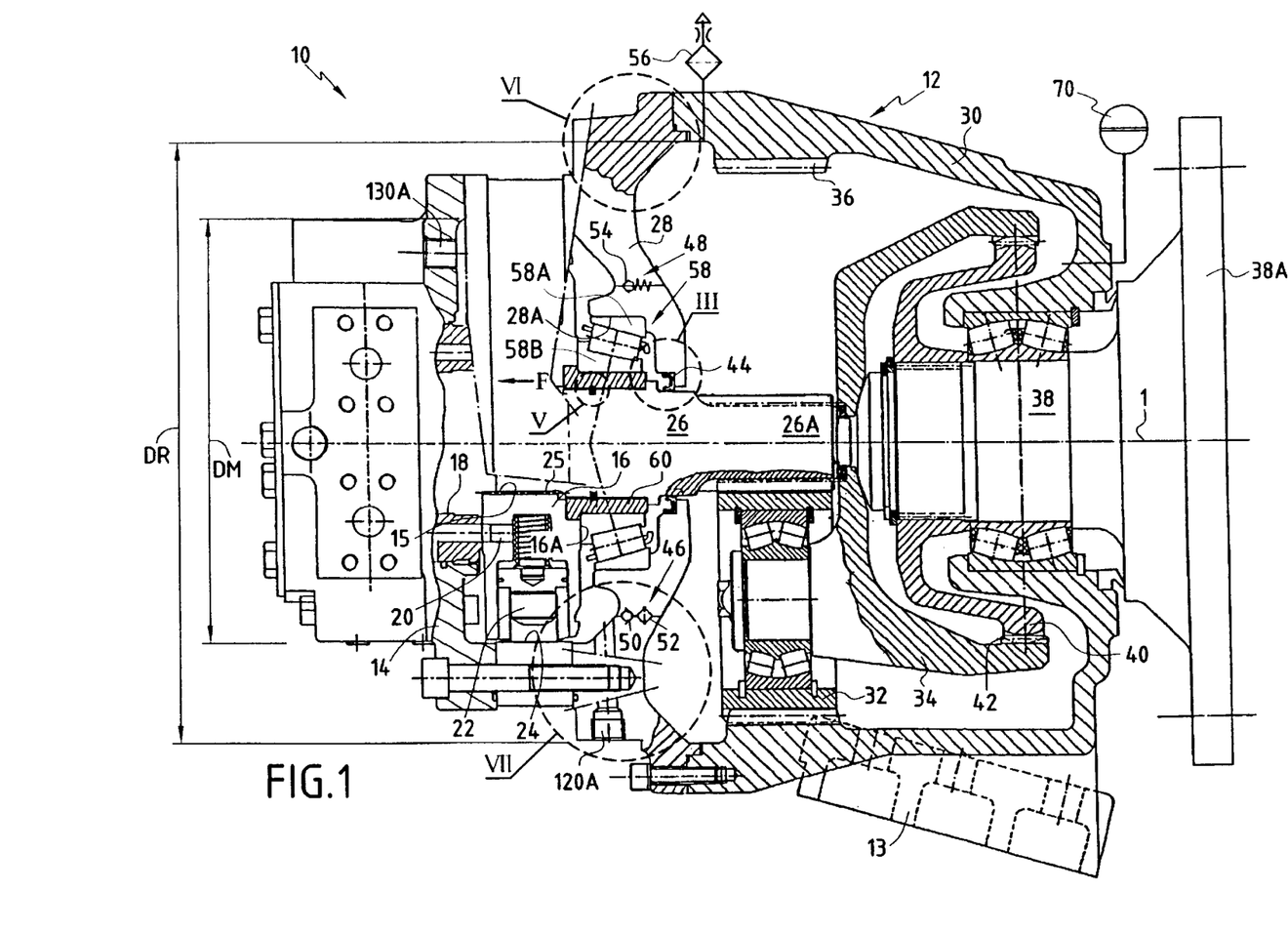
FIG. 1 shows a drive device according to the invention, the hydraulic motor being shown partly in outside view and partly in axial section, while the reduction gear is shown in axial section.

Referring now to the drawings, the drive device shown in FIG. 1 comprises a hydraulic motor 10 and a planetary reduction gear 12. The motor is of the radial piston type. It is a low-speed motor with high torque.

This motor is for example similar to the one disclosed in EP 0 191 674 of which the content is integrated in the present specification.

The housing 14 of the motor is fixed and its cylinder block 16 rotates with respect to this housing about axis of rotation 1. A fluid distributor 18 selectively connects the cylinder conduits 20 to main feed and exhaust conduits. The radial pistons 22 of the motor cooperate with the cam 24 which is fast with the housing 14.

The shaft 26 is fast in rotation with the cylinder block 16, for example via axial splines 15, 25. This shaft traverses a substantially radial flange 28 to extend in the housing of the reduction gear 30. The flange 28 constitutes a wall for separation between the housing of the motor 10 and the housing of the reduction gear 12.

The end 26A of the shaft 26 which is located in the housing of the reduction gear presents a toothed outer surface and performs the role of a sun wheel with which the planets 32 of the reduction gear cooperate. These planets are borne by a planet carrier 34, in manner known per se. The toothed wheels which the planets constitute cooperate with a ring gear 36 arranged on the inner periphery of the housing 30, which drives the planet carrier in rotation at a reduced speed with respect to that of the shaft 26.

The output shaft 38 of the reduction gear cooperates with the planet carrier by a drive flange 40 which bears a convex toothing and which meshes on a ring gear 42 formed on the inner periphery of the bell constituted by the region of the planet carrier which extends around the drive flange 40. The output shaft 38 serves for example for driving a concrete mixer drum in rotation. To that end, this shaft bears an output flange 38A intended to be fixed to the drum. A different output may, of course, be chosen as a function of the application envisaged.

The housing 14 of the motor and the housing 30 of the reduction gear form distinct enclosures, separated by the flange 28. In effect, the central bore of this flange cooperates with the outer periphery of the shaft 26 via a seal 44. However, the device comprises means for allowing a controlled circulation of fluid between the housings 14 and 30.

FIG. 1 thus shows two conduits 46 and 48, which allow a circulation of fluid between the housings 14 and 30. These conduits are formed in the flange 28.

The first conduit 46 comprises a non-return valve 50 which allows the fluid to circulate only in the direction going from the housing 30 of the reduction gear towards the housing 14 of the motor. For example, it is a ball valve arranged in a bore made in the flange 28. This conduit also comprises a filter 52 which prevents that the impurities possibly present in the housing of the reduction gear penetrate into that of the motor. This filter advantageously comprises a magnetic core.

Figure 3:
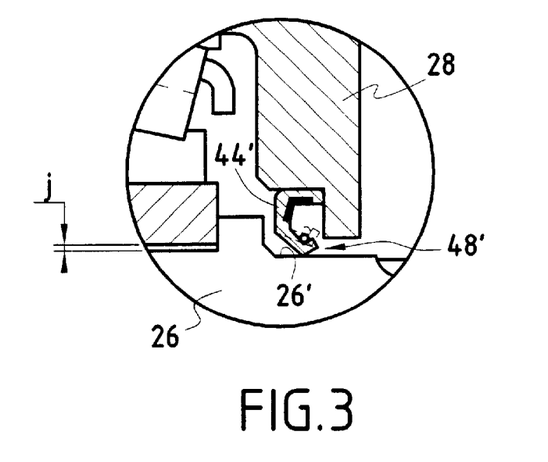
FIGS. 3 and 4 are enlarged views of variants, in zone III of FIG. 1.

The device may be fixed to a support, such as the chassis of a vehicle, by a base for mounting 13. FIG. 1 shows the device substantially in its position of operation (in which it is, however, slightly inclined with respect to what FIG. 3 shows, since the base 13 is normally horizontal), and it is seen that the first conduit 46 is disposed in a lower part of the separation wall constituted by the flange 28. In effect, the housing 30 of the reduction gear is, normally, not completely filled with fluid and it is thus ensured that the conduit 46 opens out into a region of this housing in which fluid is permanently present.

The second fluid circulation conduit 48 comprises a non-return valve 54 which allows circulation of fluid only in the direction going from the housing 14 of the motor towards the housing of the reduction gear 30. This is a calibrated valve, for example calibrated to a pressure of the order of 1 bar, thus allowing a sufficient pressure to be maintained inside the housing 14 of the motor. The conduit 48 is for example formed by a bore made in the flange 28, in which bore the calibrated valve 54 is arranged.

The second conduit 48 is arranged in an upper part of the separation wall constituted by the flange 28. It thus allows an at least partial bleeding for the housing of the motor, the conduit 48 placed in the upper part of this housing being able to evacuate air possibly contained in the motor housing towards the housing of the reduction gear 30. The excess air can then be evacuated towards the outside thanks to a device 56 for communication to the open air that the reduction gear housing 30 comprises.

In FIG. 1, the seal 44 is a fixed seal which ensures tightness between the rotating piece constituted by the drive shaft 26 and the non rotative piece constituted by the separation wall 28. The variant of FIG. 3 shows a seal 44' which is capable of occupying two positions. In that case, the second conduit 48' is arranged between the seal 44' and the drive shaft 26 or, more precisely, its outer periphery 26'. In a first position shown in solid lines, the seal 44' cooperates tightly with the shaft 26. In a second position shown in broken lines, it is separated from the outer periphery 26' of the shaft 26 and allows a circulation of fluid from the motor housing 14 towards the reduction gear housing 30. The seal 44' is mobile between one and the other of these two positions under the effect of the difference in pressure between the housing of the motor and that of the reduction gear and it is separated from the outer periphery 26' of the drive shaft 26 when this difference in pressure reaches a threshold value. It should be noted that the second fluid circulation conduit may be arranged between the seal 44' and the flange 28, the seal 44' being able to be disposed so as to be separated from this flange when the pressure difference reaches a threshold value.

Figure 4:
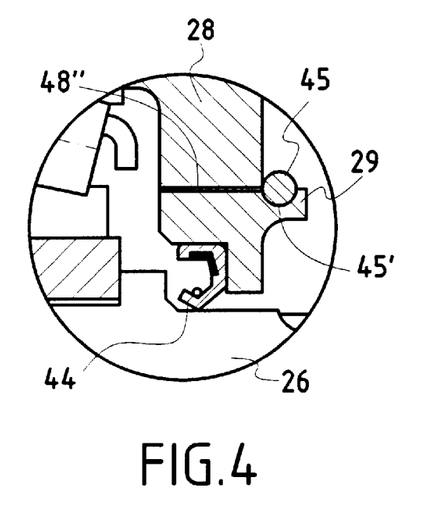

FIG. 4 shows another variant, in which a seal 44 similar to that of FIG. 1 effects tightness between the flange 28 and the outer periphery of the shaft 26. The second fluid circulation conduit is constituted by at least one bore 48" passing through the flange 28 from side to side. On the reduction gear housing side, this flange bears a seal 45, such as an O-ring. This seal is maintained in position in a groove 45' made on a portion 29 of the flange 28 slightly projecting axially in the housing of the reduction gear.

The seal 45 is elastically movable between two positions, under the effect of the pressure difference between the motor housing and the reduction gear housing. In FIG. 4, it is represented in its first position, in which it obturates the port of the conduit 48" on the reduction gear side, with the result that it prevents circulation of fluid between the motor housing and the reduction gear housing. When the pressure in the motor housing increases, with the result that the pressure difference between this housing and that of the reduction gear reaches a threshold value, for example of the order of 1 bar, the seal 45 is pushed elastically so as to be lifted slightly in the groove 45', and cease to obturate the conduit 48", which allows a circulation of fluid in the direction going from the housing of the motor towards that of the reduction gear. In this variant, the second fluid circulation conduit may be formed by a plurality of elementary conduits constituted by bores 48" disposed on the same diameter of the flange 28 (advantageously in that part of said flange located above axis 1).

For its support in rotation, the motor 10 comprises a single bearing 58 constituted by a taper roller bearing. This bearing cooperates, on the one hand, with the separation wall 28 and, on the other hand, with a centering ring 60 which is fast with the cylinder block 16 of the motor. This ring is in effect wedged in an annular setback of the radial face 16A of the cylinder block which faces towards the separation wall 28. Around this ring, the flange 28 presents an axial face 28A. The taper roller bearing is disposed between this face 28A and the outer periphery of the centering ring 60. More precisely, the outer ring 58A of the bearing 58 rests against the face 28A of the flange 28, while the inner ring 58B of this bearing rests against the outer periphery of the centering ring 60. Moreover, the inner ring of this bearing may be used for centering the cylinder block by wedging this inner ring on the cylinder block and eliminating the centering ring 60. The inner ring of the bearing might for example present a shape corresponding to that of the assembly constituted by the ring 58B and the ring 60, assembly which would then form said inner ring in one piece effecting both the internal support of the bearing and the centering of the cylinder block. In this way, the number of pieces would be limited with respect to what is shown in FIG. 1. Without the shaft 26, the motor forms a functional entity and the shaft serves to connect the output of the motor to the reduction gear. It therefore constitutes both the output shaft of the motor and the sun wheel 26A of the reduction gear. This shaft 26 extends through the centering ring 60 and a clearance j (FIG. 3), for example of the order of 0.2 mm, is formed between this shaft and this ring.

In a variant, the seal 44 may, of course, be disposed between the flange 28 and the centering ring 60. In that case, an additional seal (such as an O-ring) is disposed between the shaft 26 and the ring 60 (due to the clearance j). In that case, the sealing means which establish a tight connection between the flange 28 and the shaft 26 thus comprise the seal 44 and this additional O-ring.

Similarly, the seal 44' of the variant of FIG. 3 may be disposed between the flange 28 and the centering ring 60, an additional seal in that case being able to be disposed between this ring and the shaft 26 in order to complete the tight connection between the flange and the shaft. In this variant, the non-return system which cooperates with the second conduit 48' is generally constituted by the seal 44', the latter being able to be separated from one of the elements with which it cooperates (shaft 26, flange 28 or centering ring 60, depending on the case) in order to allow circulation of fluid from the housing of the motor towards that of the reduction gear.

Figure 5:
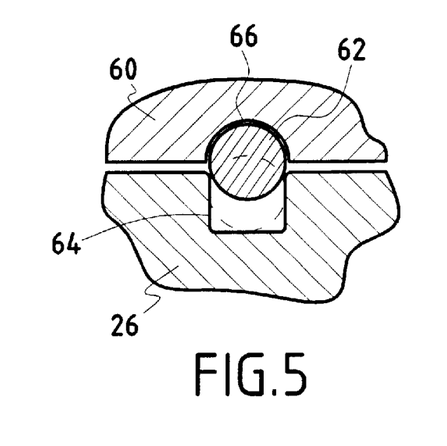
FIGS. 5 to 7 are enlarged views illustrating variants respectively located in zones V, VI and VII of FIG. 1.

The detail of FIG. 5 shows that the shaft 26 is positioned axially with respect to the centering ring 60 by means of a retaining ring 62. To that end, the outer periphery of the shaft 26 presents a first annular groove 64 whose depth is substantially equal to the diameter of the ring 62. For its part, the inner periphery of the centering ring 60 presents a second annular groove 66. When the shaft 26 is correctly positioned axially, the grooves 64 and 66 are located opposite each other. The centering ring being axially wedged with respect to the cylinder block, this assembly allows an axial wedging of the shaft with respect to the cylinder block, via the ring 60. It might be chosen to avoid using ring 60 for this wedging, by making groove 66 in the bore of the cylinder block and groove 64 in a region of the shaft located opposite.

For the introduction of the shaft 26 in the cylinder block by an axial displacement in the direction F, the ring 62 is elastically retracted inside the first annular groove 64. When the groove 64 comes opposite the groove 66, this ring may relax elastically to penetrate into the groove 66 while encroaching on the groove 64. The shaft is thus maintained in position. This system constitutes a simple means for limiting the axial displacement of the shaft and therefore to avoid deterioration of the seal 44. Moreover, it is not necessary to provide an axial stop in that piece of the reduction gear (central part of the planet carrier 34 or inner end of the shaft 38) facing the end 26A of the shaft 26.

Figure 6:
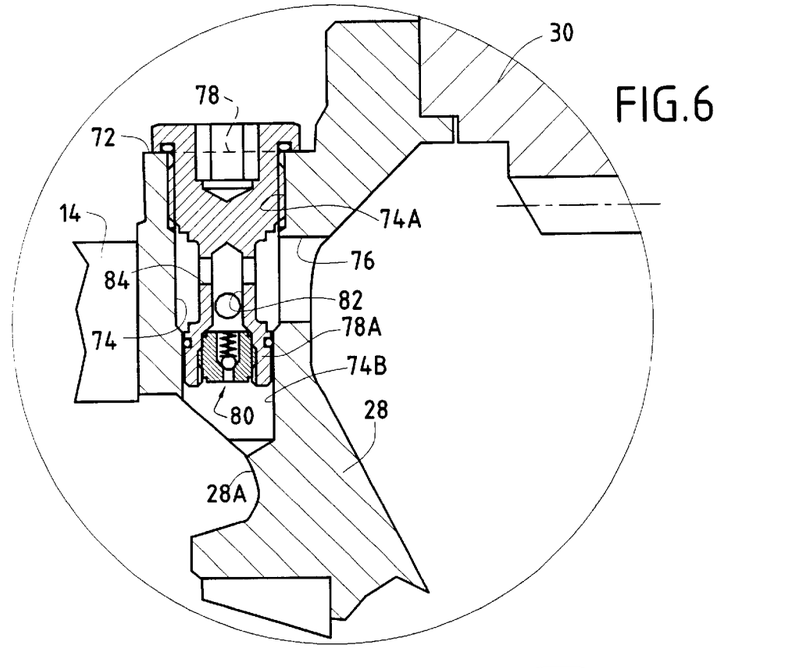

In the variant of FIG. 6, the device of the invention comprises a filling port 72 which serves for filling both the housing of the motor 14 and the housing of the reduction gear 30. This port is formed by the end of a bore 74 which is located in the region of the flange 28 so as to communicate with the two housings. The bore 74 comprises a rectilinear section substantially radial with respect to the axis of rotation 1, which extends between the port 72 and the interior space of one of the housings (housing 14 in the present case). A connecting channel 76, which is for example formed by a simple, substantially axial bore in the flange 28, connects the interior space of the other housing (housing 30 in the present case) to the bore 74.

The bore 74 and the connecting channel 76 which, considered together, form a filling conduit, are preferably formed in the flange 28 which presents a hollow zone 28A into which the end of the bore 74 opposite the port 72 opens out.

This port 72 lies in a region of the device located upwards in its position of operation. Thanks to this port, the housings 14 and 30 may be filled with fluid before the device is used. An obturation stopper 78 is then arranged in this port 72, for example fixed by screwing in the tapped end 74A of the bore 74.

This bore and the connecting channel 76 form, not only a filling conduit, but also a conduit for circulation between the housings 14 and 30, in which are disposed means allowing circulation between these housings only in one direction.

The port 72 being in the upper part of the device, this direction is preferably the one which goes from the housing of the motor 14 towards that of the reduction gear 30.

In the present case, the means allowing circulation only in one direction are formed by a non-return valve 80 fast with the stopper 78. In effect, the latter presents an extension 78A forming a hollow body which establishes, between the bore 74 and the channel 76, a communication in which the valve 80 is fixed. For example, the hollow body 78A presents a blind hole 82 whose end opens in the bore 74 opposite the port 72, as well as radial bores 84 providing communication between the blind hole 82 and the connecting channel 76. The non-return valve 80 is formed in a piece screwed at the end of the blind hole.

Alternatively, a non-return valve may be provided, formed in a piece independent of the stopper and fixed, for example by screwing, in the region 74B of the bore 74 opposite the port. The stopper would in that case be formed by a simple conventional stopper. However, the possibility represented in FIG. 6 enables the stopper and the valve to be manipulated like a single piece.

The use of a filling conduit common to the two housings in order to form a conduit for controlled circulation between these housings, proves advantageous as it reduces the number of bores necessary for filling the housings and for communication thereof, by machinings simple to effect, preferably made in the flange 28; this conduit therefore constitutes an advantageous alternative for the conduits 48, 48' and 48" described hereinabove.

When, as in FIG. 6, the direction of circulation allowed by the valve 80 is the one going from the housing of the motor 14 towards that of the reduction gear 30, the valve 80 is in that case calibrated (for example to 1 bar) in order to maintain a certain pressure in the housing of the motor.

Figure 7:
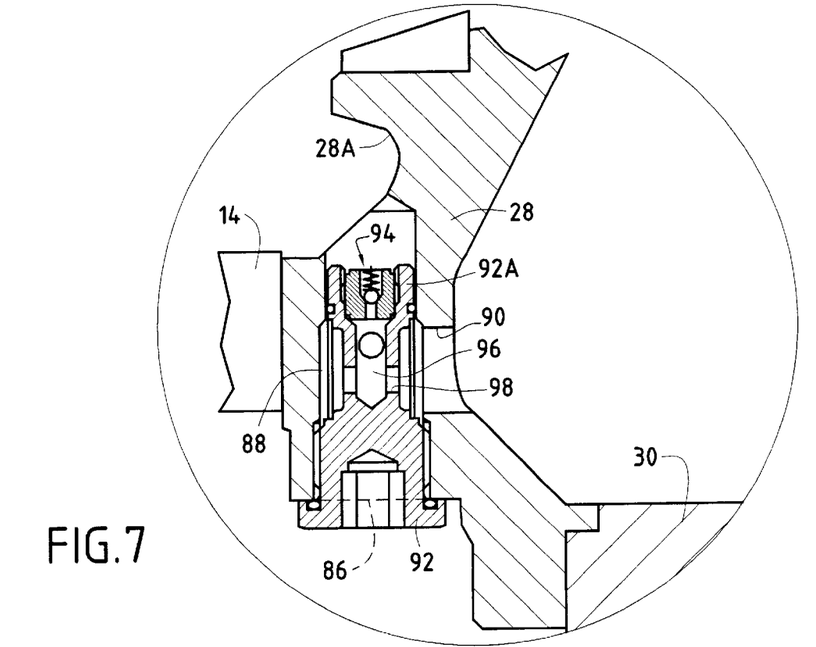

The variant of FIG. 7 provides an arrangement similar to that of FIG. 6, but for the draining of the housings. In effect, a draining port 86 common to the housings 14 and 30 is formed in the vicinity of the flange 28. A bore 88 and a connecting channel 90, respectively similar to bore 74 and channel 76, are formed in the lower part of the device so that the port 86 communicates with the two housings so as to allow draining thereof. The bore 88 and the connecting channel 90 are advantageously formed in the flange 28, the radial bore 88 opening out in the hollow zone 28A thereof.

A stopper 92 obturates the port 86. The bore 88 and the connecting channel 90 form both a draining conduit and a circulation conduit in which, when the device is in operation, there is disposed a non-return valve 94 which allows the circulation of fluid between the two housings only in one direction. This draining and circulation conduit constitutes an advantageous alternative for the conduit 46 described hereinabove. The port 86 being in the lower part of the device, this direction is preferably the one going from the housing of the reduction gear 30 towards the housing of the motor 14.

Like the valve 80, the valve 94 may be independent of the stopper 92 or may be fixed to the end of the blind hole 96 of a hollow body 92A which extends the stopper 92, this blind hole communicating with the connecting channel 90 by radial bores 98 in this body. This valve 94 is a simple, non-calibrated non-return valve, with, for example, a spring merely holding the ball on its seat.

A simple arrangement thus allows both the draining of the housings 14 and 30 and the controlled circulation of fluid between them.

Figure 2:
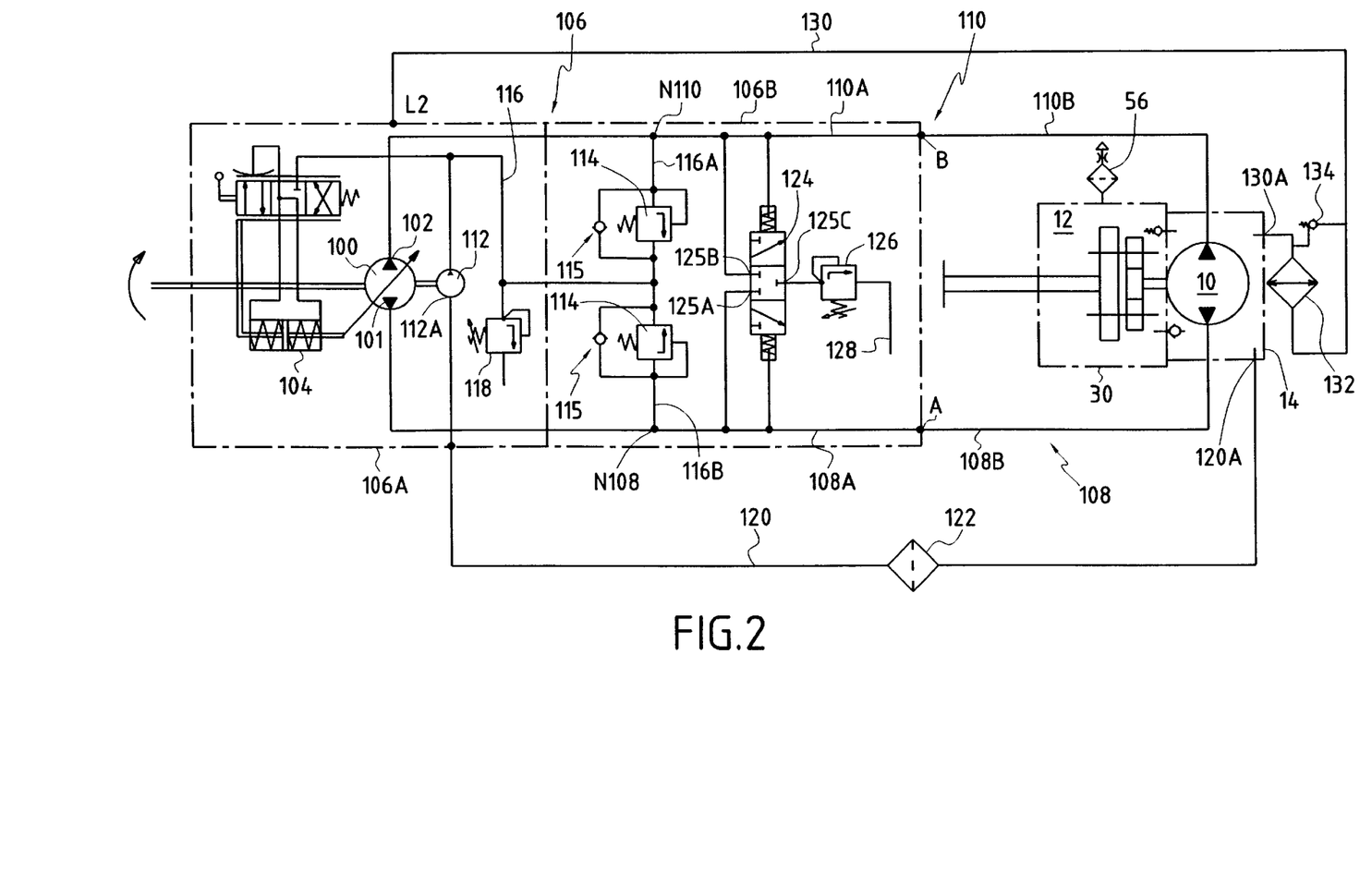
FIG. 2 is a diagram of the fluid feed circuit of this device.

Referring to FIG. 2, a hydraulic circuit for feeding fluid to the device of FIG. 1 will now be described. The motor 10 arranged in the housing 14 and the reduction gear 12 in the housing 30 are shown symbolically. The circuit is a closed circuit which comprises a main pump 100 having two ports 101 and 102, for suction and delivery of fluid. The flow rate of this pump is adjustable by a device 104 known per se. The pump forms part of a unit disposed in a housing 106. This housing presents two outer ports, A and B respectively, which are respectively connected to the ports 101 and 102 by inner conduits 108A and 110A which are internal with respect to the housing 106. The main pipes of the motor, 108B and 110B, which are outer pipes with respect to the housing 106, are respectively connected to each of these two ports. Depending on the direction of operation of the motor, these pipes 108B and 110B serve for feed or exhaust of the motor 10. In the following specification, main conduit 108 (or 110) will designate the assembly constituted by the inner conduit 108A (or 110A) and by the main pipe 108B (or 110B).

The circuit also comprises a booster pump 112 which is disposed in the housing 106. This booster pump serves to avoid cavitation in the main conduits 108 and 110 to which it is connected, respectively in a node N110 and in a node N108, by connection lines 116A and 116B on which non-return valves 115, associated with pressure limiters 114, are arranged. The pressure in the booster line 116 is maintained by a pressure limiter 118. It is seen that the excess fluid drawn by the pressure limiter 118 is directly rejected into the housing 106 or, more precisely, in that housing part 106A in which the pumps 100 and 112 are located.

In normal operation, the housing 14 of the motor 10 is filled with fluid. As shown in FIG. 2, this housing performs the role of a reservoir in which the fluid serving to feed the booster pump 112 is drawn via a drawing-off pipe 120 connected, on the one hand, to the suction port 112A of the booster pump 112 and, on the other hand, to the port 120A arranged on the housing of the motor. A filter 122 is disposed in this conduit 120. In this way, for feeding the circuit, it is unnecessary to provide a fluid reservoir other than the housing of the motor itself, for which the housing 30 of the reduction gear performs the role of an expansion vessel.

This arrangement also makes it possible to limit the fluid pressure in the motor housing and to use the reduction gear housing as a reserve of fluid for completing the fluid in the motor housing, if necessary.

Furthermore, it will be noted in FIG. 1 that a fluid level controlling system 70 is arranged on the reduction gear housing. The housing 30 of the reduction gear projects radially beyond the motor housing 14. In this way, the maximum diametral dimensions DR of the interior space of the housing 30 are greater than the maximum diametral dimensions DM of the interior space of the housing 14. The fluid level device of the controlling system 70 lies in such a spot as to ensure that the minimum fluid level in the housing 30 of the reduction gear is sufficient for the motor housing to be entirely filled. In this way, the system 70 defines a minimum fluid level which, when the device of the invention is operating, is equal to or higher than the upper limit of the interior space of the housing 14.

The closed circuit shown in FIG. 2 also comprises an exchange unit. The latter comprises an exchange valve 124 which is connected to the inner conduits 108A and 110A. The valve 124 is controlled by the pressure in these conduits so as to draw fluid from the one which is at lowest pressure. The fluid thus drawn is, via a pressure limiter 126 which maintains a sufficient pressure in the circuit, rejected into the housing 106 via a rejection pipe 128.

The housing 106 presents a housing part 106A in which the pumps 100 and 112 are disposed, and a housing part 106B in which the non-return valves 115 and the pressure limiters 114, the exchange valve 124 and the pressure limiter 126 are disposed. However, these two parts are directly fixed on each other and communicate freely with each other, with the result that they form one and the same fluid enclosure 106. In this way, the exchange or replenishing unit comprising the valve 124 and the pressure limiter 126 is integrated in the housing 106 of the main pump and makes it possible to inject into the latter the fluid drawn from the main circuit without any pipe outside the housing 106. The latter is connected to the housing 14 of the motor by a pipe 130 for return of fluid towards this housing 14. On this pipe 130 are disposed cooling means 132 for re-injecting cooled fluid into the housing 14. This system, comprising the pipes 128 and 130, effects a continuous flushing of the housing 106 of the pump and of the housing 14 of the motor. If necessary (for example at low temperature, when the viscosity of the fluid is high), the fluid may be injected into the housing 14 more directly by passing via a calibrated valve 134. The pipe 130 is connected at 130A to the housing 14 of the motor, in an upper region of the latter when it is in operating position, as is also seen in FIG. 1. On the other hand, the drawing of fluid 120A from the motor housing to which the pipe 120 is connected, is effected in a lower region of this housing.

The exchange valve 124 presents a first and a second port, 125A and 125B, respectively connected to the main pipes 108 and 110, as well as a third port 125C which is connected to the housing 106. The pressure limiter 126 is disposed between this third port and said housing.

What is claimed is:

1. A drive device incorporating a hydraulic motor and a planetary reduction gear, the motor comprising a housing inside which is disposed a cylinder block with radial pistons, the device comprising means for coupling between the output of the motor and the input of the reduction gear, the reduction gear comprising a housing inside which is disposed a planetary reduction gear system and having an output provided with means for driving in rotation, the housing of the motor and the housing of the reduction gear forming distinct enclosures, each having an interior, and the drive device comprising means for allowing a circulation of fluid between said interiors of said housings and for controlling this circulation of fluid by allowing a limited circulation of fluid at least in one direction of circulation between the interior of the housing of the motor and the interior of the housing of the reduction gear, as a function of a difference in fluid pressure between the respective interiors of said housings.

2. The device of claim 1, comprising at least one conduit for circulation of fluid between the motor housing and the reduction gear housing, said conduit being equipped with said means for limiting the circulation of fluid at least in one direction of circulation between the housing of the motor and the housing of the reduction gear.

3. The device of claim 2, wherein the housing of the motor and the housing of the reduction gear are separated by a separation wall, and the fluid circulation conduit is formed in this separation wall.

4. The device of claim 3, wherein the means for coupling between the output of the motor and the input of the reduction gear comprise a drive shaft which extends through the separation wall, a tight connection being established between said wall and said shaft, and the motor comprises a single rotating support bearing constituted by a taper roller bearing which cooperates, on the one hand, with the separation wall and, on the other hand, with a centering ring which is fast with the cylinder block of the motor, the drive shaft extending through this centering ring and a clearance being arranged between said shaft and said ring.

5. The device of claim 4, wherein the drive shaft is positioned axially with respect to the cylinder block by means of a retaining ring.

6. The device of claim 2, comprising a filling port common to the motor housing and to the reduction gear housing, which communicates with a filling conduit common to said housings, said filling conduit forming a conduit for circulation of fluid between said housings.

7. The device of claim 6, in which the filling port is obturated by a stopper which cooperates with the means for controlling the circulation of fluid between the motor housing and the reduction gear housing.

8. The device of claim 7, wherein the stopper cooperates with a non-return system which allows the circulation of fluid only in the direction going from the motor housing towards the reduction gear housing, when a difference in pressure between said housings is at least equal to a given value, and wherein the device comprises a further conduit between the motor housing and the reduction gear housing, said further conduit co-operating with a non-return system which allows the circulation of fluid only in the direction going from the reduction gear housing towards the motor housing.

9. The device of claim 7, wherein the stopper which obturates the filling port cooperates with a non-return system which allows the circulation of fluid only in the direction going from the motor housing towards the reduction gear housing, when a difference in pressure between said housings is at least equal to a given value, and wherein the stopper which obturates the draining port cooperates with a non-return system which allows the circulation of fluid only in the direction going from the reduction gear housing towards the motor housing, further comprising a draining port common to the motor housing and to the reduction gear housing, which communicates with a draining conduit common to said housings, said draining conduit forming a conduit for circulation of fluid between said housings, wherein the draining port is obturated by a stopper which cooperates with the means for controlling the circulation of fluid between the reduction gear housing and the motor housing.

10. The device of claim 2, comprising a draining port common to the motor housing and to the reduction gear housing, which communicates with a draining conduit common to said housings, said draining conduit forming a conduit for circulation of fluid between said housings.

11. The device of claim 10, wherein the draining port is obturated by a stopper which cooperates with the means for controlling the circulation of fluid between the reduction gear housing and the motor housing.

12. The device of claim 11, wherein the stopper cooperates with a non-return system which allows the circulation of fluid only in the direction going from the reduction gear housing towards the motor housing, and wherein the device comprises a further conduit between the motor housing and the reduction gear housing, said further conduit co-operating with a non-return system which allows the circulation of fluid only in the direction going from the motor housing towards the reduction gear housing, when a difference in pressure between said housings is at least equal to a given value.

13. The device of claim 1, comprising a first and a second conduit for circulation of fluid between the housing of the motor and the housing of the reduction gear, the first conduit cooperating with a first non-return system which allows the circulation of the fluid only in the direction going from the reduction gear housing towards the motor housing, while the second conduit cooperates with a second non-return system which allows the circulation of the fluid only in the direction going from the motor housing towards the reduction gear housing, when a difference in pressure between said housings is at least equal to a given value.

14. The device of claim 13, wherein the housing of the motor and the housing of the reduction gear are separated by a separation wall, and the first and second conduits for circulation of fluid are formed, at least in part, in the separation wall.

15. The device of claim 14, wherein, when the device is in operation, the first fluid circulation conduit is disposed in a lower part of the separation wall.

16. The device of claim 14, wherein, when the device is in operation, the second fluid circulation conduit is disposed in an upper part of the separation wall.

17. The device of claim 13, wherein the first fluid circulation conduit comprises a filter.

18. The device of claim 13, wherein the means for coupling between the output of the motor and the input of the reduction gear comprise a drive shaft which extends through the separation wall, sealing means being disposed between said wall and said shaft, and the second fluid circulation conduit is arranged between the sealing means and one of the elements with which said seal cooperates, this seal being capable, under the effect of a pressure difference between the motor housing and the reduction gear housing, of occupying a first position in which it obturates said second conduit and a second position in which it allows a circulation of fluid from the motor housing towards the reduction gear housing.

19. The device of claim 1, comprising a level control system for controlling a level of fluid in the reduction gear housing.

20. The device of claim 19, wherein the level control system defines a minimum level which, when the device is in operation, is higher than an upper limit of the interior space of the motor housing.

21. A circuit for feeding fluid to the drive device of claim 1, the circuit being a closed circuit comprising a main pump which comprises a housing, presenting two main suction or delivery ports and which is intended to feed a main circuit comprising main feed and exhaust conduits of the hydraulic motor, the circuit further comprising a booster pump having a main suction port connected to a fluid reservoir which is constituted by the housing of the hydraulic motor.

22. The circuit of claim 21, further comprising a replenishing unit adapted to draw fluid from the main circuit and means for cooling said fluid and for returning the cooled fluid to the reservoir constituted by the housing of the hydraulic motor, the replenishing unit being integrated in the housing of the main pump and being directly connected to said housing, so as to inject thereinto the fluid drawn from the main circuit, without a conduit outside said housing.

23. The circuit of claim 22, wherein the replenishing unit comprises a replenishing valve which presents a first and a second port, respectively connected to the main feed and delivery conduits, as well as a third port connected to the housing of the main pump, and wherein a pressure limiter is disposed between said third port and said housing.

24. The circuit of claim 21, wherein the housing of the main pump is connected to the housing of the hydraulic motor by a pipe for return of fluid towards the reservoir constituted by said motor housing, on which cooling means are disposed.

* * * * *